United States Patent
Suganuma

(10) Patent No.: US 7,314,129 B2
(45) Date of Patent: Jan. 1, 2008

(54) IMAGE FORMING APPARATUS

(75) Inventor: Toshihiro Suganuma, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/638,562

(22) Filed: Dec. 14, 2006

(65) Prior Publication Data

US 2007/0261937 A1 Nov. 15, 2007

(30) Foreign Application Priority Data

Apr. 27, 2006 (JP) .............................. 2006-123797

(51) Int. Cl.
*B65G 45/00* (2006.01)
*G03G 21/00* (2006.01)

(52) U.S. Cl. ...................... 198/497; 399/350
(58) Field of Classification Search ................ 198/497, 198/498; 399/123, 350
See application file for complete search history.

(56) References Cited

U.S. PATENT DOCUMENTS

| 4,630,920 | A | * | 12/1986 | Silverberg et al. .......... 399/164 |
| 5,138,363 | A | * | 8/1992 | Yuge ............................ 355/24 |
| 5,268,725 | A | * | 12/1993 | Koga et al. .................. 399/312 |
| 5,426,485 | A | * | 6/1995 | Fujita et al. ................. 399/350 |
| 5,559,590 | A | * | 9/1996 | Arai et al. ................... 399/314 |
| 6,347,212 | B1 | * | 2/2002 | Kosugi et al. .............. 399/348 |
| 6,453,134 | B1 | * | 9/2002 | Ziegelmuller et al. ...... 399/101 |
| 6,968,149 | B2 | * | 11/2005 | Takahashi et al. .......... 399/347 |
| 7,068,959 | B2 | * | 6/2006 | Allen et al. .................... 399/98 |

FOREIGN PATENT DOCUMENTS

| JP | 2838550 B2 | 5/1991 |
| JP | 8-137298 A | 5/1996 |

* cited by examiner

*Primary Examiner*—Douglas A Hess
(74) *Attorney, Agent, or Firm*—Sughrue Mion Pllc.

(57) ABSTRACT

The image forming apparatus includes two tension rollers; a conveyor belt movably supported at the two tension rollers; a plurality of transfer parts that are arranged on the back surface side of the conveyor belt and between the two tension rollers, that contact one surface of the back surface of the conveyor belt, and that form a predetermined clearance with an opposite portion of the back surface of the conveyor belt; and a cleaning blade for removing residual toner remaining on the conveyor belt. The cleaning blade has the front end contacting the conveyor belt at a predetermined pressure. The cleaning blade is arranged at a position where the back surface of the conveyor belt distorted by the front end does not contact the tension roller.

5 Claims, 3 Drawing Sheets

IMAGE FORMING APPARATUS

BACKGROUND OF THE INVENTION

1. Technical Field

The present invention relates to image forming apparatuses, more specifically, to a cleaning mechanism of a conveyor belt for conveying a recording medium.

2. Related Art

In the cleaning mechanism, the conveyor belt is often stretched simply between two tension rollers (driving roller and driven roller) having a small diameter, for example, in order to miniaturize the conveyor belt mechanism in an image forming apparatus for transferring a toner image of yellow, magenta, cyan, black on a recording paper (recording medium) and forming an image. A configuration of contacting the front end of a cleaning blade made of rubber at a predetermined pressure is adopted when cleaning the surface of the conveyor belt. The cleaning blade is arranged at a predetermined angle to a non-conveying surface, which is a surface of the conveyor belt that is not the paper conveying surface.

However, the cleaning blade configured as above may be bent in the belt conveying direction. Normally, the bending returns (restores) to its original state by the elastic force of the cleaning blade itself when the drive of the conveyor belt is stopped. However, since the space on the back surface side of the conveyor belt stretched between the two tension rollers becomes extremely narrow when the conveyor belt mechanism is compact, as described above, the bent front end of the cleaning blade may touch the tension roller and the like, and may not return to its original state (not restore by the elastic force of cleaning blade itself) even if the drive of the conveyor belt is stopped.

SUMMARY

The image forming apparatus of one aspect of the present invention includes: two tension rollers; a conveyor belt movably supported at the two tension rollers; a plurality of transfer parts that are arranged, with a recording medium conveying side of the conveyor belt as the front surface, on the back surface side of the conveyor belt and between the two tension rollers, and that contact one surface of the back surface of the conveyor belt, a predetermined clearance being formed between the transfer parts and an opposite portion of the back surface of the conveyor belt; and a cleaning blade for removing residual toner remaining on the conveyor belt, the cleaning blade being arranged at a position where the front end of the cleaning blade contacts the conveyor belt at a predetermined pressure and the back surface of the conveyor belt distorted by the front end does not contact the tension roller.

BRIEF DESCRIPTION OF THE DRAWINGS

Embodiments of the present invention will be described in detail based on the following figures, wherein.

DESCRIPTION

Figure 1:
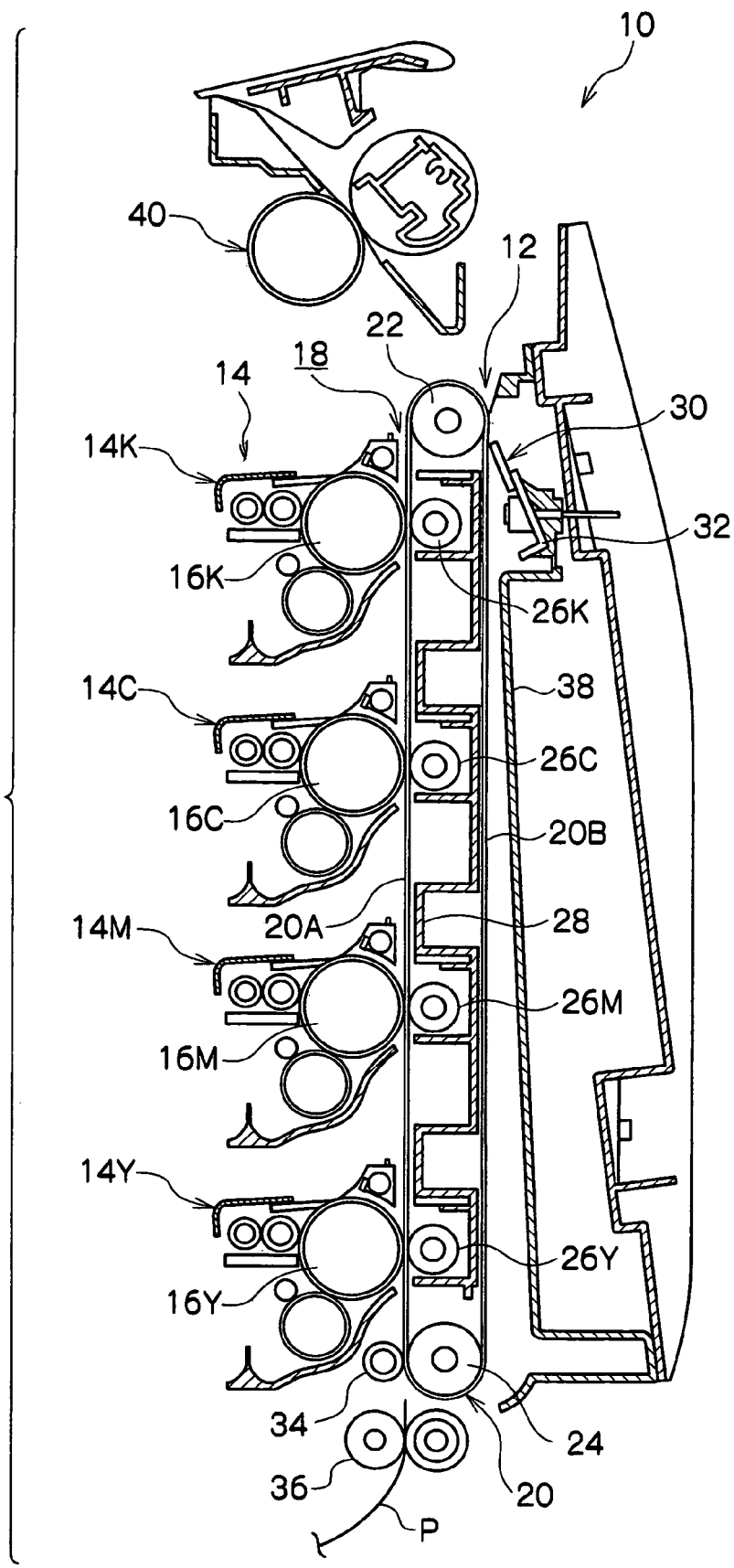
FIG. 1 is a schematic side view showing a configuration near a transfer unit of an image forming apparatus.
Figure 2:
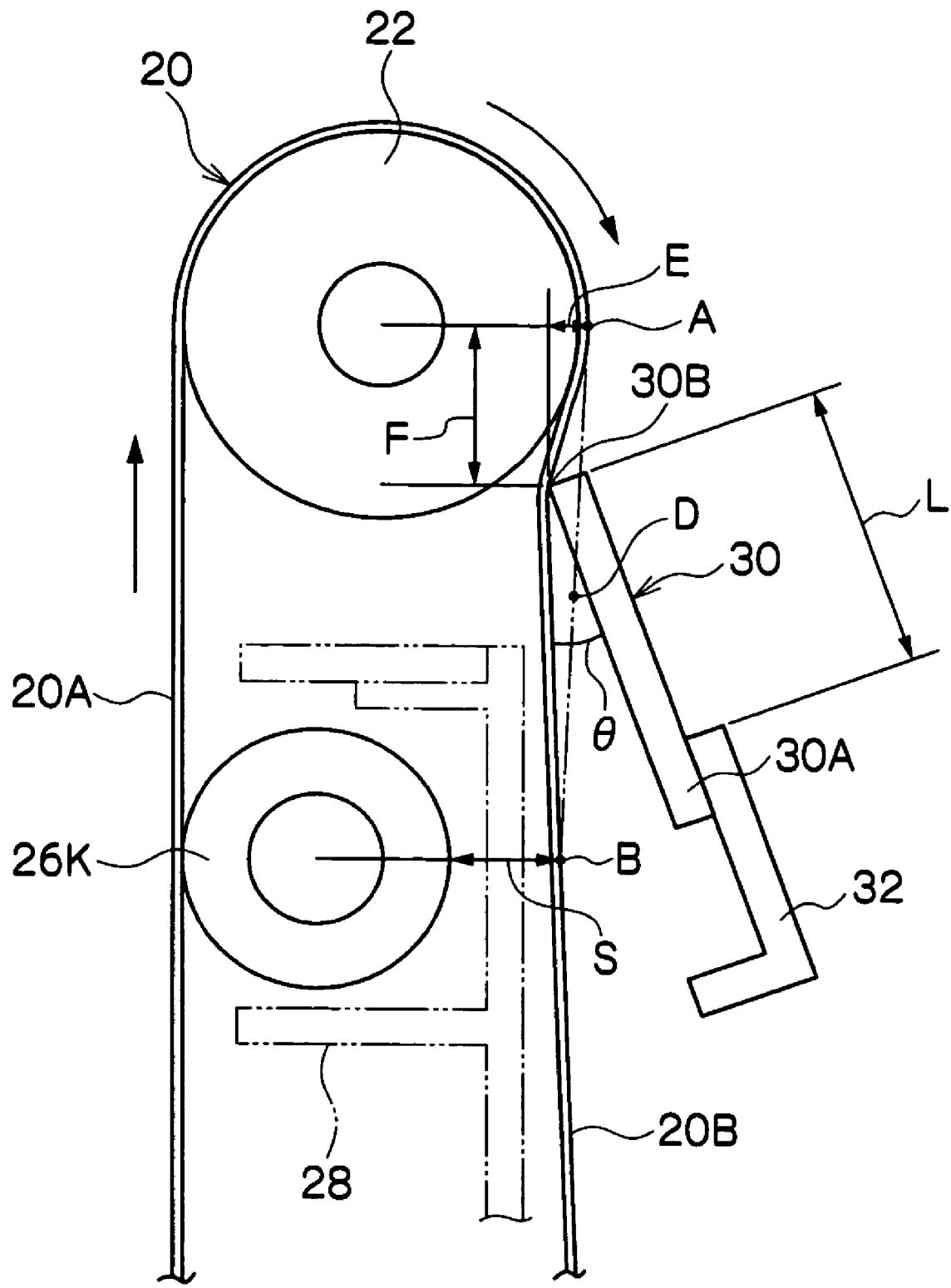
FIG. 2 is an explanatory view showing an arrangement of a cleaning blade.
Figure 3:
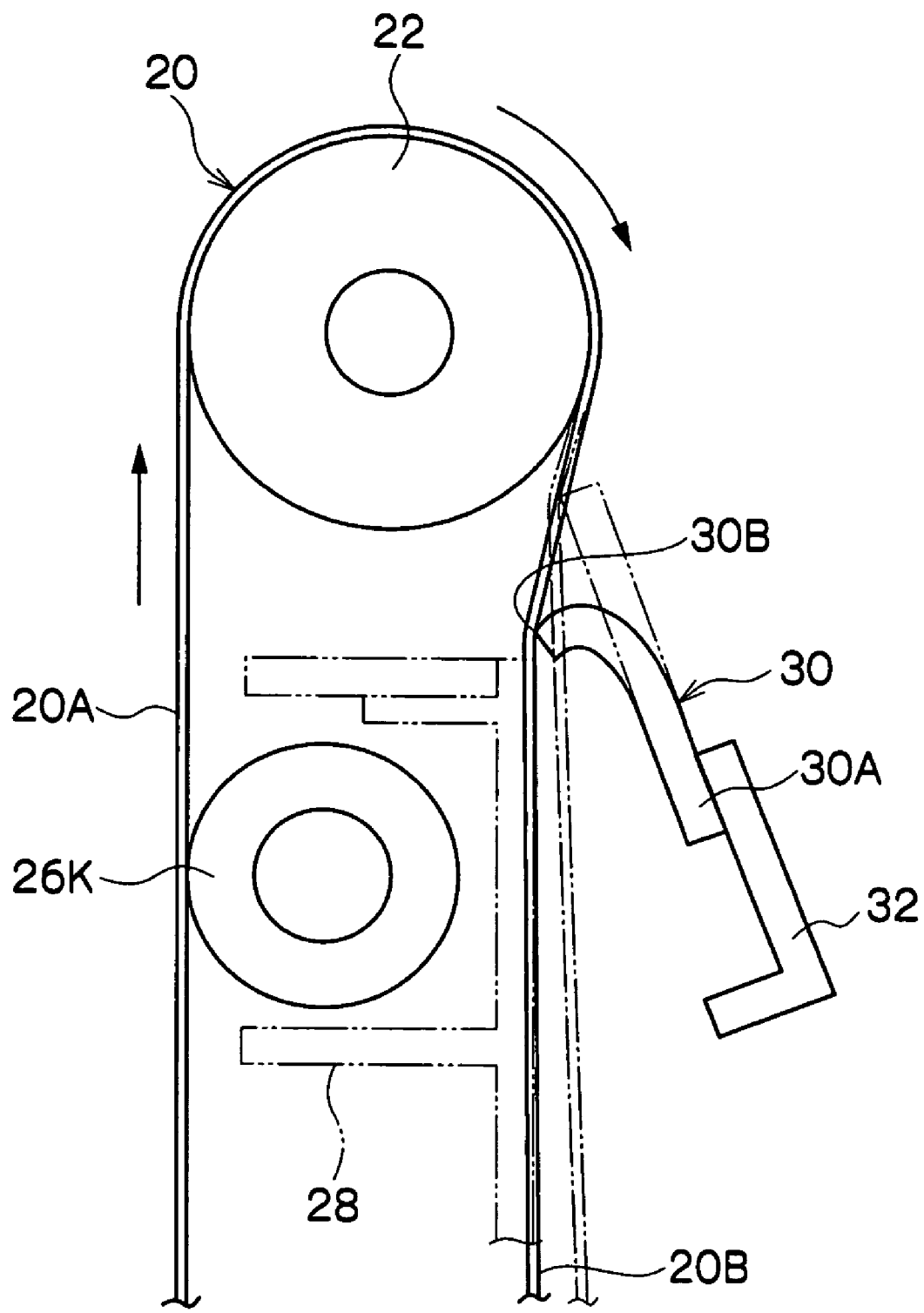
FIG. 3 is an explanatory view showing a bent state of the cleaning blade.

The exemplary embodiment of the present invention will now be described in detail based on examples shown in the figure. FIG. 1 is a schematic side view showing a configuration near a transfer unit 12 of an image forming apparatus 10 according to an exemplary embodiment of the invention, and FIGS. 2 and 3 are schematic side views showing a cleaning blade 30. As shown in FIG. 1, an image forming unit 14 including a photosensitive drum 16 is arranged for each color along a paper conveying direction with respect to the transfer unit 12 including a conveyor belt 20 that configures a paper conveying path 18.

The photosensitive drums 16Y to 16K are arranged at a predetermined interval in a state projected to a predetermined height to the paper conveying path 18 side (conveyor belt side) in each image forming unit 14Y to 14K of yellow (Y), magenta (M), cyan (C), black (K) from the upstream side of the paper conveying direction, which is the lower side in FIG. 1. A fixing device 40 for fixing the toner image transferred to the recording paper P is arranged on the downstream side in the paper conveying direction of the transfer unit 12. In the image forming apparatus 10, the toner, which is an image forming material, for forming the image on the recording paper P has a substantially spherical shape.

In the transfer unit 12, the conveyor belt 20 that configures the paper conveying path 18 is configured to absorb and convey the charged recording paper P, and an adsorption roller 34 is arranged on the upstream side in the paper conveying direction of the conveyor belt 20. A registration roller 36 for supplying the recording paper P to the paper conveying path 18 at a predetermined timing is arranged on the upstream side further from the adsorption roller 34 in the paper conveying direction.

In order to minimize the image forming apparatus 10 (transfer unit 12), the conveyor belt 20 is stretched only between two tension rollers placed rotationally in a housing 28, that is, a driving roller 22 on the downstream side in the paper conveying direction and a driven roller 24 on the upstream side in the paper conveying direction. The diameter of the driving roller 22 and the driven roller 24 is, for example, 18 mm. One surface of the conveyor belt 20 facing each image forming unit 14Y to 14K is a conveying surface 20A, and the opposite side is a non-conveying surface 20B.

Furthermore, transfer rollers 26Y to 26K touching the photosensitive drums 16Y to 16K of each color by way of the conveyor belt 20 are arranged on the back surface side of the conveyor belt 20 between the driving roller 22 and the driven roller 24. Each transfer roller 26Y to 26K is placed rotationally in the housing 28 so as to be parallel in the axial direction thereof with the axial direction of the driving roller 22 and the driven roller 24, and the diameter thereof is, for example, 12 mm.

The transfer roller 26 preferably has a large diameter in terms of transfer maintaining property. Therefore, the diameter of the transfer roller 26Y to 26K is preferably greater than or equal to 50% of the diameter of the driving roller 22 and the driven roller 24. As shown in detail in FIG. 2, a predetermined clearance (space) S is formed in the normal line direction of the non-conveying surface 20B between each transfer roller 26Y to 26K and the back surface on the non-conveying surface 20B side of the conveyor belt 20. When the housing 28 is present, the predetermined clearance S is formed between the housing 28 and the conveyor belt 20. The clearance S will be hereinafter described in detail.

A cleaning blade 30 for removing residual toner remaining on the conveyor belt 20 is arranged on the non-conveying surface 20B side of the conveyor belt 20. The cleaning blade 30 is configured by an elastic body such as rubber, and has the base 30A attached to a supporting member 32, which supporting member 32 is positioned and attached in the housing 38 (see FIG. 2). The housing 38 is positioned and attached to the housing 28 for supporting the driving roller 22 and the driven roller 24, so that the front end 30B of the cleaning blade 30 touches (presses) the non-conveying surface 20B at a predetermined pressure in a state inclined at a predetermined angle θ thereto.

The cleaning blade 30 will now be described in more detail. As shown in FIG. 2, the cleaning blade 30 has a free end length L on the front end side from the supporting member 32 of L=5 mm to 15 mm, for example. As described above, the front end 30B of the cleaning blade 30 touches (presses) the non-conveying surface 20B of the conveyor belt 20 at a predetermined pressure, and the interference E with respect to the conveyor belt 20 is, for example, about E=0.5 mm to 1.5 mm. Accordingly, the cleaning performance with respect to the residual toner is thereby achieved. The interference E is defined as the amount from the belt surface of when the cleaning blade 30 is not touching (pressing) the non-conveying surface 20B of the conveyor belt 20, where the interference E is assumed to be an effective value smaller than a set value since the conveyor belt 20 distorts.

The cleaning blade 30 is arranged at a position where, even if the front end 30B presses against the non-conveying surface 20B of the conveyor belt 20 at a predetermined pressure and distorts the same, the back surface of the non-conveying surface 20B of the distorted conveyor belt 20 does not contact (slidably contact) the driving roller 22. Moreover, the front end 30B of the cleaning blade 30 is arranged at a position that satisfies the following relationship. That is, in the side view in FIG. 2, if an intersection of a line (normal line), which passes through the center of the transfer roller 26K arranged proximate to the driving roller 22 and is orthogonal to the non-conveying surface 20B of the conveyor belt 20, and the conveyor belt 20 is defined as point B, and the position where the conveyor belt 20 separates from the driving roller 22 in a state where the cleaning blade 30 is not touching (pressing) the conveyor belt 20 is defined as point A, the front end 30B is arranged at a position closer to point A than a midpoint point D of a line connecting point A and point B.

Further, the housing 28 is interposed between the transfer roller 26 and the cleaning blade 30, but the housing 28 is not present on the back surface side of the non-conveying surface 20B of the conveyor belt 20 at the location where the front end 30B of the cleaning blade 30 touches (presses). That is, in the side view in FIG. 2, if the distance in the advancing direction of the non-conveying surface 20B of the conveyor belt 20 from point A where the conveyor belt 20 separates from the driving roller 22 in the state where the cleaning blade 30 is not touching (pressing) the conveyor belt 20 to the front end 30B of the cleaning blade 30 is defined as an offset amount F, the housing 28 is not present within twice the offset amount F from point A in the relevant direction. Thus, the front end 30B of the cleaning blade 30 does not touch the housing 28 even if bent in the advancing direction of the conveyor belt 20, as shown in FIG. 3.

The clearance S will now be described. The clearance S has a size that sufficiently tolerates the deflection amount of the conveyor belt 20 caused by the front end 30B of the cleaning blade 30 bending in the advancing direction of the conveyor belt 20, as shown FIG. 3. Furthermore, the clearance S has a size such that the back surface of the conveyor belt 20 deformed by the front end 30B of the cleaning blade 30 does not contact the transfer roller 26 and the housing 28, thus allowing the bent cleaning blade 30 to return to the original state by its elastic force.

In other words, the clearance S is appropriately set by the diameter of the driving roller 22 and the driven roller 24, the diameter of the transfer roller 26, and the free end length L of the cleaning blade 30. In the present embodiment, the clearance S is set shorter than the free end length L of the cleaning blade 30 to miniaturize the transfer unit 12, and to miniaturize the diameters of the driving roller 22 and the driven roller 24. The clearance S in the present embodiment is about S=6 mm. The clearance S of when the housing 28 is present is about S=0.3 mm when the interference E is E=1.4 mm.

The operation of the image forming apparatus configured as above will now be described. The recording paper P conveyed to the transfer unit 12 is timed by the registration roller 26 and charged by the adsorption roller 34, and then supplied to the paper conveying path 18. The charged recording paper P is then adsorbed to the conveyor belt 20, and conveyed to the downstream side along the paper conveying path 18. Accompanied with the conveyance, the toner image of each color is transferred to the recording paper P by each image forming unit 14Y to 14K. The recording paper P transferred with the toner image of each color is conveyed to the fixing device 40, after the toner image is fixed to the recording paper P, and then discharged.

The residual toner remaining on the conveyor belt 20 without being transferred to the recording paper P is scraped off by the cleaning blade 30 that touches (presses) the non-conveying surface 20B of the conveyor belt 20 at a predetermined pressure. Since the cleaning blade 30 touches the non-conveying surface 20B in a state inclined by a predetermined angle θ to the non-conveying surface 20B, the front end 30B thereof sometimes bends towards the non-conveying surface side 20B due to advancement of the non-conveying surface 20B, as shown in FIG. 3.

However, even if the front end 30B of the cleaning blade 30 bends and presses the non-conveying surface 20B at a predetermined pressure thereby distorting the same, the back surface of the distorted non-conveying surface 20B is arranged at the position that does not contact (slidably contact) the driving roller 22, and a predetermined clearance S is formed between the transfer roller 26 and the back surface of the non-conveying surface 20B. Therefore, the front end 30B can restore to the original state by the elastic force of the cleaning blade 30 itself by stopping the drive of the conveying belt 20. In other words, when the cleaning blade 30 restores to the original state, the front end 30B does not touch the driving roller 22, and the conveyor belt 20 greatly deflects so as not to inhibit the restoration of the front end 30B.

The transfer roller 26 is arranged at a position that does not contact the back surface of the non-conveying surface 20B even if the conveyor belt 20 is distorted by the bent cleaning blade 30. That is, since a predetermined clearance S is formed between the transfer roller 26 and the back surface of the non-conveying surface 20B, the back surface of the distorted non-conveying surface 20B does not contact the transfer roller 26 even if the conveyor belt 20 is greatly distorted by the bent front end 30B of the cleaning blade 30.

Furthermore, the contact between the back surface of the non-conveying surface 20B of the conveyor belt 20 and the transfer roller 26 is avoided since the housing 28 is interposed between the cleaning blade 30 and the transfer roller 26. Therefore, lowering in transfer efficiency (transfer defect due to defect in application of transfer bias) that occurs when the conveyor belt 20 contacts the transfer roller 26, or image forming defect (transfer defect) due to damage of the transfer roller 26 are prevented.

In the side view in FIG. 2, the housing 28 is not present within twice the offset amount F from point A in the advancing direction of the non-conveying surface 20B of the conveyor belt 20. Therefore, the front end 30B does not touch the housing 28 when the cleaning blade 30 restores to the original state. That is, the housing 28 is prevented from being an obstruction in restoring the bending of the cleaning blade 30. Therefore, the bending of the cleaning blade 30 is reliably restored, and occurrence of failure, repair and the like of the apparatus is avoided. The operation rate of the image forming apparatus 10 is thereby enhanced, and lowering of productivity is prevented.

Moreover, the lubrication between the cleaning blade 30 and the residual toner remaining on the surface of the conveyor belt 20 enhances since a substantially spherical toner is used in the image forming apparatus 10. Therefore, the cleaning blade 30 is easily restored from the bent state even by the toner. Furthermore, the cleaning blade 30 is arranged so that the front end 30B is positioned closer to point A from the middle point D between point A and point B. Therefore, the front end 30B of the cleaning blade 30 is suitably pressed against the conveyor belt 20 (non-conveying surface 20B) at a predetermined pressure. Thus, the cleaning performance are suitably maintained and stabilized.

When the clearance S becomes smaller or the space between the driving roller 22 (driven roller 24) and the transfer roller 26 becomes narrower due to miniaturization of the image forming apparatus 10, that is, miniaturization of the transfer unit 12 and miniaturization of the diameters of the driving roller 22 and the driven roller 24, the bent front end 30B of the cleaning blade 30 may touch the housing 28 by way of the conveyor belt 20.

However, this is not a problem if the bent front end 30B of the cleaning blade 30 does not go over the housing 28, and it is to an extent of touching the housing 28 by way of the conveyor belt 20. In other words, in such case, the cleaning blade 30 can return to the original state by its elastic force by stopping the drive of the conveyor belt 20, similar to the above. Furthermore, as the bent front end 30B of the cleaning blade 30 touches the housing 28 by way of the conveyor belt 20, the force to return to the original state may be acted on by the housing 28.

As described above, the front end 30B of the cleaning blade 30 basically does not contact the components on the back surface side of the conveyor belt 20, for example, the driving roller 22, the driven roller 24, the transfer rollers 26Y to 26K, the housing 28 for holding the driving roller 22, the driven roller 24, as well as the transfer rollers 26Y to 26K etc. by way of the conveyor belt 20 even if the front end 30B of the cleaning blade 30 is bent. Even if the front end 30B contacts the above components due to the miniaturization of the apparatus, it is considered as simply touching.

Therefore, the bending of the front end 30B of the cleaning blade 30 is reliably restored by stopping the drive of the conveyor belt 20 in the conveyor belt mechanism stretched only between the driving roller 22 and the driven roller 24. In other words, a state in which the bent front end 30B of the cleaning blade 30 does not return to the original state leads to the determination of a defect of the apparatus thereby lowering the productivity is reliably avoided.

The present invention aims to provide an image forming apparatus for reliably restoring the bending of the cleaning blade in the conveyor belt mechanism stretched between the two tension rollers.

The image forming apparatus of one aspect of the present invention includes: two tension rollers; a conveyor belt movably supported at the two tension rollers; a plurality of transfer parts that are arranged, with a recording medium conveying side of the conveyor belt as the front surface, on the back surface side of the conveyor belt and between the two tension rollers, and that contact one surface of the back surface of the conveyor belt, a predetermined clearance being formed between the transfer parts and an opposite portion of the back surface of the conveyor belt; and a cleaning blade for removing residual toner remaining on the conveyor belt, the cleaning blade being arranged at a position where the front end of the cleaning blade contacts the conveyor belt at a predetermined pressure and the back surface of the conveyor belt distorted by the front end does not contact the tension roller.

According to the above aspect, the cleaning blade is arranged at a position where the back surface of the conveyor belt distorted by the front end of the cleaning blade does not contact the tension roller. Furthermore, a predetermined clearance is formed between the transfer part and an opposite portion of the back surface of the conveyor belt. Therefore, even if the front end of the cleaning blade is bent in the advancing direction of the conveyor belt, the front end of the cleaning blade can return to the original state by the elastic force of the cleaning blade when at least the movement of the conveyor belt is stopped. That is, the conveyor belt may be greatly distorted by the bent front end of the cleaning blade but will not contact the transfer part, and the front end of the cleaning blade does not touch the tension roller, and thus the bending of the cleaning blade is reliably restored.

In the above aspect, the front end of the cleaning blade may be arranged closer to the tension roller than a midpoint position between the tension roller and the transfer part that is closest to the tension roller.

According to the above aspect, the cleaning performance is maintained and stabilized since the front end of the cleaning blade suitably presses against the conveyor belt.

In the above aspect, the transfer part may be arranged at the position not contacting the opposite portion of the back surface of the conveyor belt distorted by the bent cleaning blade even if the cleaning blade is bent in the advancing direction of the conveyor belt.

According to the above aspect, the conveyor belt distorted by the cleaning blade and the transfer part do not contact even if the cleaning blade is bent during image formation, and thus a bias voltage is not lowered at the transfer part caused by the contact of the conveyor belt and the transfer part, thereby the transfer performance is not affected.

In the above aspect, a supporting part for supporting at least the transfer part may be further arranged. The supporting part may be interposed between the transfer part and the cleaning blade.

According to the above aspect, the contact between the conveyor belt and the transfer part is prevented by the supporting part even if the cleaning blade is bent during image formation, and thus a bias voltage is not lowered at the transfer part caused by the contact of the conveyor belt and the transfer part, and the transfer performance is not affected. Furthermore, the clearance between the transfer part and the opposite portion of the back surface of the conveyor belt is made shorter than the free end length of the cleaning blade, as necessary, thereby thinning of the conveyor belt and miniaturization of the roller diameter of the tension roller become possible.

In the above aspect, the supporting part may not be arranged at a position facing the portion of the back surface side of the conveyor belt at a contacting position of the front end of the cleaning blade, and may be arranged to have a clearance shorter than a free end length of the cleaning blade between the supporting part and the opposite portion of the back surface of the conveyor belt.

According to the above aspect, when the cleaning blade is bent, the cleaning blade is prevented from remaining bent even after the conveyor belt is stopped since the supporting part is not arranged at the position facing the portion of the back surface side of the conveyor belt at the contacting position of the front end of the cleaning blade. Furthermore, due to the arrangement of the clearance shorter than the free end length of the cleaning blade between the supporting part and the opposite portion of the back surface of the conveyor belt, the opposite portion of the back surface of the conveyor belt and the supporting part may contact, a force to return the bent cleaning blade is acted on when the conveyor belt is advancing or when the conveyor belt is stopped.

In the above aspect, the supporting part may not be arranged at a position facing a portion of the back surface side of the conveyor belt at a contacting position of the front end of the cleaning blade, and may be arranged at a position facing a portion of the back surface side of the conveyor belt at a contacting position of the front end of the bent cleaning blade when the cleaning blade is bent in the advancing direction of the conveyor belt.

According to the above aspect, when the cleaning blade is bent, the cleaning blade is prevented from remaining bent even after the conveyor belt is stopped since the supporting part is not arranged on the back surface side of the conveyor belt at the contacting position of the front end of the cleaning blade. Furthermore, since the back surface side of the conveyor belt and the supporting part contact at the contacting position of the front end of the bent cleaning blade, the force to strongly return the bent cleaning blade is acted on when the conveyor belt is advancing or when the conveyor belt is stopped.

In the above aspect, the image forming apparatus may be configured such that the supporting part is not present within twice an offset amount F from point A in the advancing direction of the conveyor belt, where point A is a point at which the conveyor belt separates from the tension roller, and the offset amount F is a distance in the advancing direction of the conveyor belt from point A to the front end of the cleaning blade when the cleaning blade is not touching (pressing) the conveyor belt.

According to the above aspect, when the cleaning blade is bent, the front end does not touch the supporting part when the cleaning blade restores to the original state. That is, the supporting part is prevented from being an obstruction in restoring the bending of the cleaning blade.

Therefore, according to each aspect, the image forming apparatus that reliably restores the bending of the cleaning blade in a conveyor belt mechanism stretched between two tension rollers is provided.

What is claimed is:

1. An image forming apparatus comprising:
   two tension rollers;
   a conveyor belt movably supported by the two tension rollers;
   a plurality of transfer parts that are arranged, with a recording medium conveying side of the conveyor belt as the front surface, on a back surface side of the conveyor belt and between the two tension rollers, and that contact one surface of the back surface of the conveyor belt, a predetermined clearance being formed between the transfer parts and an opposite portion of the back surface of the conveyor belt; and
   a cleaning blade for removing residual toner remaining on the conveyor belt, the cleaning blade being arranged at a position where the front end of the cleaning blade contacts the conveyor belt at a predetermined pressure and the back surface of the conveyor belt distorted by the front end does not contact the tension roller;
   wherein the transfer parts are arranged at a position at which they do not contact the opposite portion of the back surface of the conveyor belt distorted by a bent cleaning blade when the cleaning blade is bent in the advancing direction of the conveyor belt.

2. An image forming apparatus comprising:
   two tension rollers;
   a conveyor belt movably supported by the two tension rollers;
   a plurality of transfer parts that are arranged, with a recording medium conveying side of the conveyor belt as the front surface, on a back surface side of the conveyor belt and between the two tension rollers, and that contact one surface of the back surface of the conveyor belt, a predetermined clearance being formed between the transfer parts and an opposite portion of the back surface of the conveyor belt;
   a cleaning blade for removing residual toner remaining on the conveyor belt, the cleaning blade being arranged at a position where the front end of the cleaning blade contacts the conveyor belt at a predetermined pressure and the back surface of the conveyor belt distorted by the front end does not contact the tension roller; and
   further comprising a supporting part for supporting at least one of the transfer parts, the supporting part being interposed between the at least one of the transfer parts and the cleaning blade.

3. The image forming apparatus of claim 2, wherein the supporting part is not arranged at a position facing a portion of the back surface side of the conveyor belt at a contacting position of the front end of the cleaning blade which contacts the conveyor belt, and is arranged so that there is a clearance shorter than a free end length of the cleaning blade between the supporting part and the opposite portion of the back surface of the conveyor belt.

4. The image forming apparatus of claim 2, wherein the supporting part is not arranged at a position facing a portion of the back surface side of the conveyor belt at a contacting position of the front end of the cleaning blade which contacts the conveyor belt, and is arranged at a position facing a portion of the back surface side of the conveyor belt at a contacting position of the front end of a bent cleaning blade which contacts the conveyor belt when the cleaning blade is bent in the advancing direction of the conveyor belt.

5. The image forming apparatus of claim 2, wherein the supporting part is not present within twice an offset amount F from point A, where point A is a point at which the conveyor belt separates from the tension roller, and the offset amount F is a distance in the advancing direction of the conveyor belt from point A to the front end of the cleaning blade when the cleaning blade is not touching (pressing) the conveyor belt.

* * * * *